United States Patent [19]

Chapman et al.

[11] 4,250,441
[45] Feb. 10, 1981

[54] SERVO APPARATUS WITH ELECTRICAL MOTION LIMITING

[75] Inventors: James Chapman, Airdrie, Scotland; James W. Ratz, Bloomington, Minn.

[73] Assignee: Honeywell Inc., Minneapolis, Minn.

[21] Appl. No.: 19,131

[22] Filed: Mar. 9, 1979

[51] Int. Cl.³ .............................................. G05G 5/00
[52] U.S. Cl. ................................... 318/626; 318/663; 318/468
[58] Field of Search .............. 318/663, 666, 626, 628, 318/677, 468, 289

[56] References Cited

U.S. PATENT DOCUMENTS

| | | | |
|---|---|---|---|
| 2,633,558 | 3/1953 | Wild | 318/663 X |
| 3,091,321 | 5/1963 | Ashworth | 197/189 |
| 3,263,038 | 7/1966 | Walker | 200/61.13 |
| 3,315,266 | 4/1967 | Lapinski | 346/32 |
| 3,323,700 | 6/1967 | Epstein et al. | 226/17 |
| 3,406,309 | 10/1968 | Martens | 318/663 X |
| 3,488,017 | 1/1970 | Schatteman | 242/191 |
| 3,617,837 | 11/1971 | Beck | 318/212 |
| 3,684,213 | 8/1972 | Golden | 242/201 |
| 3,789,283 | 1/1974 | Kabat | 318/663 X |
| 4,000,804 | 1/1977 | Zaltieri | 197/151 |
| 4,025,830 | 5/1977 | Delaporte | 318/6 |
| 4,038,664 | 7/1977 | Muir | 346/1 |
| 4,044,233 | 8/1977 | Sato | 235/92 PE |
| 4,062,048 | 12/1977 | Weber | 360/72 |
| 4,078,198 | 3/1978 | Murakosi et al. | 318/663 |

*Primary Examiner*—B. Dobeck
*Attorney, Agent, or Firm*—Laurence J. Marhoefer; Lockwood D. Burton; Mitchell J. Halista

[57] ABSTRACT

The servo apparatus includes a series resistor string connected in parallel with the body of the servo slidewire resistor. Upscale and downscale travel limit voltage points, corresponding to upscale and downscale travel limit positions for the slidewire contact, are established along the resistor string. The limit voltages on the limit voltage points are separately compared with the slidewire contact voltage, and appropriate motor drive signal interrupting signals are produced when the slidewire contact voltage exceeds the upscale limit voltage or drops below the downscale limit voltage. The interrupting signals effect their motor drive signal interrupting action by reversing the output polarity of motor drive comparators which produce the motor drive signals under the control of an error amplifier which compares the apparatus input voltage to the slidewire contact voltage.

6 Claims, 1 Drawing Figure

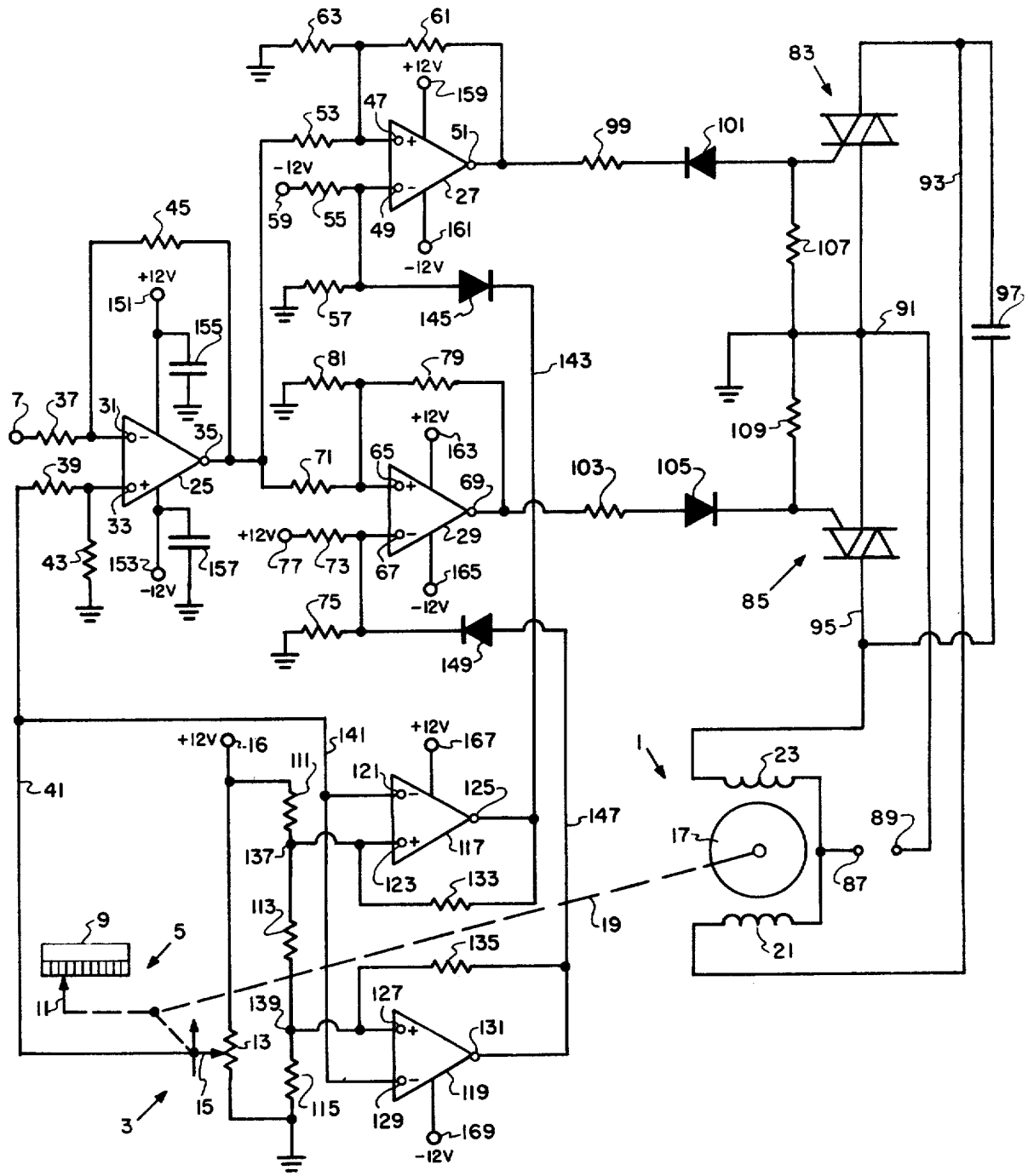

SERVO APPARATUS WITH ELECTRICAL MOTION LIMITING

BACKGROUND OF THE INVENTION

1. Field of the Invention

The present invention relates generally to measuring, indicating, recording, and/or controlling apparatus of the electrical servo or self-balancing type, hereinafter referred to simply as servo apparatus. Specifically, the invention relates to the servo or rebalancing portion of such apparatus, wherein a servo motor adjusts the position of both a feedback element and a slaved display and/or control element as necessary to make that position representative of an electrical input signal or voltage. More specifically, the invention relates to the forms of such apparatus wherein travel limiting means are provided for effectively terminating the driving energization of the motor when the feedback and slaved elements have been moved to preset limit positions along their paths of travel.

2. Description of the Prior Art

In the known servo apparatus as described above, motor drive means are provided to compare the input voltage to a feedback voltage which represents the position of the motor-driven feedback element along its path of travel. The feedback element may well be the sliding contact of an adjustable feedback resistor. In response to such voltage comparison, the motor drive means feed upscale and downscale motor drive signals to the motor as required to cause the motor to keep the position of the feedback element repesentative of the input voltage.

In apparatus as just described, there is a tendency for the motor drive the feedback element past its acceptable upscale and downscale travel end points. Such points are defined as ones past which the feedback element should not or must not be moved. In those forms of said known apparatus wherein physical limit stops are provided on the feedback element travel path or its equivalent to define the acceptable travel end points, there is a tendency for the motor to continue in the stalled but energized condition to force the feedback element against such stops after that element has been driven to them. Such obviously undesirable tendencies to overdrive the feedback element occur when the input voltage moves outside of the measuring range for which the apparatus is arranged and calibrated.

The overtravel or overdrive tendencies just described are overcome in the above-noted known travel limiting forms of servo apparatus by the use of the noted means for terminating the motor energization when the feedback element has been moved to preset upscale and downscale travel limit positions. Such positions, which will be referred to hereinafter simply as limit positions, are usually established just short of the corresponding acceptable end points, or just short of the physical limit stops if present.

The establishment of the limit positions in the known apparatus is effected by so physically positioning or locating switching means that the latter are actuated when the driven feedback element reaches a point in its travel which is to be one of the limit positions. Such switch actuation interrupts or at least modifies the application of the motor drive signals to the motor, and hence terminates, or at least substantially reduces, the driving action of the motor which has produced the switch actuation. In this way, the motor is prevented from attempting to continue to move the feedback element in the same direction once a limit position has been reached. Consequently, the motor is prevented from attempting to drive the feedback element past the acceptable travel end points, and is prevented from continuing to force the feedback element against any physical limit stops which are present. The switching means in the known apparatus thus prevents the motor from driving or attempting to drive the feedback element out of its acceptable range of movement, and thus limits and restricts that range of movement to a desired range which lies between the limit positions.

In all of the forms of the known apparatus of which we are aware, the above noted switch actuation is effected by the movement of the feedback element, or of an element which is made to follow the feedback element, into a predetermined physical relationship with the switching means. The actuation is usually effected either mechanically, magnetically, optically, inductively, capacitively, or the like. An example of one form of such known apparatus is the apparatus of the Wild U.S. Pat. No. 2,633,558, wherein a member is caused to follow the feedback element, and wherein the switching means consists of switches which are mechanically acutated by the member when the latter reaches a position which corresponds to one of the limit positions. have performed satisfactorily in many applications, there has continued to be a need for a simpler form of such apparatus which would not be encumbered with the physically-actuated switching means of the known apparatus forms. Thus, there has been a need for a simplified travel limiting form of servo apparatus wherein the switching means would not require or utilize any physically movable parts, and wherein no particular physical position of the switching means relative to the moving portions of the servo apparatus would be required.

SUMMARY OF THE INVENTION

Accordingly, it is an object of the present invention to provide improved servo apparatus of the travel limiting type which is characterized by the simplicity of its travel limiting means with respect to those of the known apparatus. Specifically, it is an object of the invention to provide such improved apparatus which is further characterized by its freedom from the use of mechanical or other types of limit switches which require a particular physical relationship with respect to the moving portions of the apparatus.

To the end of accomplishing the above-noted and other desirable objects, the improved servo apparatus according to the present invention includes means for effecting the required travel limiting of the feedback element in a totally electrical manner. Specifically, the apparatus includes means for establishing first and second travel limit voltage points at which respective limit voltages are produced which correspond to the feedback voltage of the feedback element when the latter is at its respective upscale and downscale limit positions. The improved apparatus also includes voltage comparing means which are connected to receive and compare the feedback element voltage and the limit voltages. In response to those comparisons, the comparing means produce corresponding upscale and downscale motor drive interrupting signals. Those signals are applied to the motor drive means of the apparatus to interrupt or at least modify the application of upscale motor drive signals to the servo motor when the feedback element has reached its upscale limit position, and to interrupt or at least modify the application of downscale motor drive signals to the motor when the feedback element has reached its downscale limit position. By virtue of this construction, the improved apparatus restricts the feedback element to an acceptable range of travel between its limit positions, and prevents the motor from attempting to keep driving the feedback element in the same direction once a limit position has been reached, without the use of switches or other means which must be physically related in a specific manner to the limit positions and to the moving portions of the apparatus.

BRIEF DESCRIPTION OF THE DRAWING

A better understanding of the present invention may be had from the following detailed description when read in connection with the accompanying drawing, wherein the single FIGURE is a schematic circuit diagram of voltage measuring and indicating servo apparatus constructed according to the invention.

DETAILED DESCRIPTION

The Apparatus of the Drawing

The servo apparatus illustrated in the drawing, and constituting a preferred example of the above-described improved apparatus embodying the present invention, is voltage measuring and indicating apparatus which is constructed to provide a continuous display or indication of the value of an input signal or voltage which is applied to the apparatus. To that end, the apparatus includes a servo motor 1 which drives and adjusts both a feedback device 3 and an indicating device 5 so that the latter consistently indicates the value of the applied input voltage. That voltage is applied to the apparatus between an input terminal 7 and apparatus common or ground.

Specifically, the indicating device 5 includes a scale 9 and a cooperating pointer 11 which is positionable along the length of the scale 9. Further, the feedback device 3 is a variable, or so-called slidewire, resistor having a resistor body 13 and a feedback element in the form of a sliding contact 15 which is positionable along the length of the body 13. The upper end of the resistor body 13 is connected to a +12 volt supply terminal 16, and the lower end of the resistor body 13 is connected to ground.

The motor 1 is a reversible A.C. capacitor motor, and includes a rotor 17 which is mechanically coupled by a linkage 19 to the feedback contact 15 and to the scale pointer 11. The motor 1 also includes an upscale drive winding 21 and a downscale drive winding 23. The described arrangement is such that, when the upscale winding 21 is energized, the rotor 17 rotates and moves the pointer 11 to the right or upscale, and moves the contact 15 correspondingly upward or upscale. Similarly, the energization of the downscale motor winding 23 causes the rotor 17 to move the pointer 11 to the left or downscale, and to move the contact 15 correspondingly downward or downscale.

The illustrated apparatus also includes motor drive means which, in turn, include operational amplifiers 25, 27, and 29, as well as other devices to be described hereinafter. The amplifier 25 is used as a negative feedback error amplifier, and the amplifiers 27 and 29 are used as respective upscale and downscale motor drive comparators. Those devices are connected between the input terminal 7, the feedback resistor 3, and the motor windings 21 and 23 in a manner which now be described.

The error amplifier 25 has an inverting input terminal 31, a non-inverting input terminal 33, and an output terminal 35. The input terminal 31 is connected through a resistor 37 to the apparatus input terminal 7. The input terminal 33 is connected through a resistor 39 and a conductor 41 to the feedback contact 15. The terminal 33 is also connected through a resistor 43 to ground. The output terminal 35 is connected through a feedback resistor 45 to the input terminal 31 to cause the amplifier 25 to operate as a negative feedback amplifier. The output terminal 35 is also connected to the inputs of the upscale and downscale motor drive comparators 27 and 29 in a manner which will be described below.

The upscale motor drive comparator 27 has a non-inverting input terminal 47, an inverting input terminal 49, and an output terminal 51. The input terminal 47 is connected through a resistor 53 to the output terminal 35 of the error amplifier 25. Resistors 55 and 57 are connected in series between a −12 volt bias supply terminal 59 and ground, and the junction between those resistors is connected to the input terminal 49. The output terminal 51 is connected through positive feedback resistors 61 and 63 to ground, and the junction between those resistors is connected to the input terminal 47.

The downscale motor drive comparator 29 has a non-inverting input terminal 65, an inverting input terminal 67, and an output terminal 69. The input terminal 65 is connected through a resistor 71 to the output terminal 35 of the error amplifier 25. Resistors 73 and 75 are connected in series between a +12 volt bias supply terminal 77 and ground, and the junction between those resistors is connected to the input terminal 67. The output terminal 69 is connected through positive feedback resistors 79 and 81 to ground, and the junction between those resistors is connected to the input terminal 65. The resistors 55, 57, 73, and 75 apply bias voltages to the comparators 27 and 29 to establish a dead-band which prevents the motor 1 from hunting. The positive feedback resistors 61, 63, 79, and 81 produce hysteresis which stabilizes the switching operation of the comparators 27 and 29.

The motor drive means of the illustrated apparatus also include an upscale motor driving triac 83 and a downscale motor driving triac 85. Those triacs are connected between a source of A.C. motor energizing voltage, not shown, and the respective motor windings 21 and 23 in a manner which will now be described.

One end of each of the motor windings 21 and 23 is connected to an A.C. supply voltage terminal 87. The latter has a companion A.C. supply voltage terminal 89. In practice, the terminals 87 and 89 would be connected across the above-noted source of A.C. motor energizing voltage. The terminal 89 is connected by a conductor 91 to one of the principle electrodes of each of the triacs 83 and 85. Those electrodes are also connected to ground. The other principle electrode of the upscale triac 83 is connected by a conductor 93 to the remaining end of the upscale motor winding 21. The remaining principle electrode of the downscale triac 85 is connected by a conductor 95 to the remaining end of the downscale motor winding 23. A capacitor 97 is connected between the said remaining ends of the motor windings 21 and 23 by being connected between the conductors 93 and 95.

The connections which have just been described establish an upscale motor winding circuit which can be traced from the supply terminal 87 and through the upscale winding 21, the conductor 93, the triac 83, and the conductor 91 back to the other supply terminal 89. Similarly, said connections also establish a downscale motor winding circuit which can be traced from the supply terminal 87 and through the downscale winding 23, the conductor 95, the triac 85, and the conductor 91 back to the other supply terminal 89.

The triacs 83 and 85 are controlled by the respective upscale and downscale motor drive comparators 27 and 29. Specifically, the output terminal 51 of the comparator 27 is connected through a resistor 99 and the cathode-anode path of a diode 101 to the control electrode of the triac 83. Similarly, the output terminal 69 of the comparator 29 is connected through a resistor 103 and the anode-cathode path of a diode 105 to the control electrode of the triac 85. The control electrodes of the triacs 83 and 85 are also connected through respective resistors 107 and 109 to ground.

As described so far, the illustrated apparatus constitutes a typical servo arrangement which moves the feedback contact 15 and the pointer 11 as necessary to keep their positions in correspondence with an input voltage applied to the apparatus input terminal 7. In addition, in accordance with the invention, the illustrated apparatus includes the above-noted means which electrically limit the travel of the feedback contact 15 to an acceptable range of travel which lies between an upscale limit position and a downscale limit position.

The travel limiting means of the illustrated apparatus include resistors 111, 113, and 115 which are connected in series in the order stated between the positive supply voltage terminal 16 and ground. Thus, the resistive divider formed by the resistors 111, 113, and 115 is energized in parallel with the feedback resistor body 13. The travel limiting means also include an upscale limit comparator 117 and a downscale limit comparator 119. The comparator 117 is an operational amplifier having an inverting input terminal 121, a non-inverting input terminal 123, and an output terminal 125. Similarly, the comparator 119 is an operational amplifier having a non-inverting input terminal 127, an inverting input terminal 129, and an output terminal 131. A stabilizing positive feedback resistor 133 is connected between the output terminal 125 and the input terminal 123 of the comparator 117, and a similar resistor 135 is connected between the output terminal 131 and the input terminal 127 of the comparator 119.

The upscale limit comparator input terminal 123 is connected to an upscale travel limit voltage point 137 which is at the junction between the resistors 111 and 113. Similarly, the input terminal 127 of the downscale limit comparator 119 is connected to a downscale travel limit voltage point 139 which is at the junction between the resistors 113 and 115. Also, the input terminal 121 and 129 of the comparators 117 and 119 are connected by a conductor 141 and the conductor 41 to the feedback contact 15.

The values of the resistors 111, 113, and 115 are so chosen that: (a) the voltage on the upscale travel limit voltage point 137 is an upscale limit voltage which is substantially equal to the voltage which will appear on the feedback contact 15 when the latter is moved upscale to a position which is to be its upscale limit position, and (b) the voltage on the downscale travel limit voltage point 139 is a downscale limit voltage which is substantially equal to the voltage which will appear on the feedback contact 15 when the latter is moved downscale to a position which is to be its downscale limit position. If desired, the limit voltage points 137 and 139 could be points on the movable contacts of adjustable resistors which would replace the fixed resistors 111, 113, and 115 and would permit the limit positions to be readily established and changed.

The output terminal 125 of the upscale limit comparator 117 is connected through a conductor 143 and the cathode-anode path of a diode 145 to the input terminal 49 of the upscale motor drive comparator 27. Similarly, the output terminal 131 of the downscale limit comparator 119 is connected through a conductor 147 and the anode-cathode path of a diode 149 to the input terminal 67 of the downscale motor drive comparator 29.

Before concluding the description of the construction of the illustrated apparatus, it is noted that each of the devices 25, 27, 29, 117, and 119 is supplied with the necessary energizing voltage. Specifically, the amplifier 25 is connected to a +12 volt supply terminal 151 and to a −12 volt supply terminal 153. Bypass capacitors 155 and 157 connect the respective terminals 151 and 153 to ground. The comparator 27 is connected to a +12 volt supply terminal 159 and to a −12 volt supply terminal 161. The comparator 29 is connected to a +12 volt supply terminal 163 and to a −12 volt supply terminal 165. Finally, the comparator 117 is connected to a +12 volt supply terminal 167, and the comparator 119 is connected to a −12 volt supply terminal 169.

OPERATION OF THE APPARATUS OF THE DRAWING

When the illustrated apparatus is connected to receive the above-noted energizing voltages, the resulting voltage across the feedback resistor body 13 causes a feedback voltage to be produced on the feedback contact 15 and on the conductors 41 and 141. That voltage is representative of the position of the feedback contact 15 along the energized resistor body 13. The resistors 39 and 43 cause a fixed percentage of said feedback voltage to be applied to the input terminal 33 of the error amplifier 25. Consequently, the voltage on the input terminal 33 is also representative of the position of the contact 15 along the resistor body 13, and is the actual feedback voltage which is sensed by the error amplifier 25. The connection of the contact 15 to the limit comparator input terminals 121 and 129 by the conductors 41 and 141 also applies the feedback voltage to those comparators.

The input voltage which is applied to the apparatus input terminal 7 from the outside world produces a corresponding input voltage on the input terminal 31 of the error amplifier 25. The latter compares the input voltage on the terminal 31 to the feedback voltage on the terminal 33. When those two voltages are equal, it means that the positions of the feedback contact 15 and the pointer 11 correspond to the existing value of the input voltage which is applied to the terminal 7. When this occurs, the apparatus is said to be in the balanced condition or simply to be balanced. When the apparatus is so balanced, the motor 1 is not energized for rotation in either direction. In practice, the scale 9 will have been suitably calibrated so that, when the apparatus is balanced, the position of the pointer 11 indicates a voltage point on the scale 9 which corresponds to the existing value of the input voltage.

The reason that the motor 1 is not operatively energized when the apparatus is balanced is that the resulting equality between the voltages on the error amplifier input terminals 31 and 33 causes the voltage or signal on the error amplifier output terminal 35, and hence on the motor drive comparator input terminals 47 and 65, to be effectively zero. Under this condition, the negative bias voltage on the input terminal 49 of the upscale motor drive comparator 27 from the supply terminal 59 causes the comparator 27 to be saturated and to produce a positive signal on its output terminal 51. Such a signal does not constitute a motor drive signal for the motor 1 since the diode 101 blocks such a positive signal and prevents it from turning on the triac 83. Consequently, the upscale motor winding 21 is not energized.

Similarly, for this balanced condition of the apparatus, the positive bias voltage on the input terminal 67 of the downscale motor drive comparator 29 from the supply terminal 77 causes the comparator 29 to be saturated and to produce a negative signal on its output terminal 69. Such a signal does not constitute a motor drive signal for the motor 1 since the diode 105 blocks such a negative signal and prevents it from turning on the triac 85. Consequently, the downscale motor winding 23 is not energized. It is assumed in connection with the foregoing description that the apparatus input voltage for which the apparatus is balanced lies within the voltage range for which the apparatus is calibrated, under which condition the limit comparators 117 and 119 do not have any effect on the voltages on the motor drive comparator input terminals 49 and 67.

In summary, when the apparatus is balanced, no motor drive signals are produced by the comparators 27 and 29, neither of the triacs 83 and 85 is turned on, and neither of the motor windings 21 and 23 is operatively energized. Therefore, the motor rotor 17 remains stationary for the balanced condition of the apparatus.

Let it now be assumed that the input voltage on the input terminal 7 increases to a new value which is above the previous value for which the apparatus was in balance. Let it also be assumed that this new, higher input voltage is still within the voltage range for which the apparatus has been calibrated. The appearance of the new, higher value of input voltage on the error amplifier input terminal 31 causes a negative signal to be produced on the output terminal 35 and hence on the input terminal 47 of the upscale motor drive comparator 27 and on the input terminal 65 of the downscale motor drive comparator 29. The presence of this negative signal on the input terminal 65 has no effect on the downscale comparator 29, or on its output signal, since this comparator is already saturated in the negative sense as noted above. Accordingly, the negative signal from the error amplifier 25 has no effect on the downscale triac 85, and there is thus no tendency for the motor 1 to be energized for operation in the downscale direction.

It is assumed that the magnitude of said apparatus input voltage increase is sufficient to cause the error amplifier output signal on the upscale comparator input terminal 47 to be sufficiently negative to overcome the deadband bias voltage on the comparator input terminal 49 and to reverse the saturation of the comparator 27, thereby to switch the output signal on the output terminal 51 from positive to negative. This negative output signal is passed by the diode 101 and turns on the upscale triac 83, and hence constitutes an upscale motor drive signal.

The now turned on triac 83 causes the alterating current from the terminals 87 and 89 to pass through the upscale motor winding 21. At that time, the capacitor 97 produces a properly phased current flow through the downscale motor winding 23. The net result is that the motor rotor 17 rotates in the direction to move both the feedback contact 15 and the pointer 11 in the upscale direction.

As the motor 1 drives the feedback contact 15 in the upscale direction, the feedback voltage on the error amplifier input terminal 33 correspondingly increases. All of this continues until the feedback voltage on the terminal 33 once again brings the output of the error amplifier 25 into the deadband. When this occurs, the output of the upscale motor drive comparator 27 switches from negative to positive, the upscale motor drive signal effectively disappears, the triac 83 turns off, and the energization of the motor 1 is terminated. The apparatus is now again in the balanced condition, with the pointer 11 at a new upscale position corresponding to the new, higher value of the apparatus input voltage. Again, the limit comparators 117 and 119 have had no effect on the motor drive comparators 27 and 29, since, as noted, the apparatus input voltage is assumed to have remained within the calibrated range of the apparatus.

Let it now be assumed that the input voltage on the input terminal 7 decreases to a new value which is below the value for which the apparatus was balanced in the previous description. Let it also be assumed that this new, lower input voltage is still within the voltage range for which the apparatus has been calibrated. The appearance of the new, lower value of input voltage on the error amplifier input terminal 31 causes a positive signal to be produced on the output terminal 35 and hence on the input terminals 47 and 65 of the respective upscale and downscale motor drive comparators 27 and 29. The presence of this positive signal on the input terminal 47 has no effect on the upscale comparator 27, or on its output signal, since this comparator is already saturated in the positive sense as noted above. Accordingly, the positive signal from the error amplifier 25 has no effect on the upscale triac 83, and there is thus no tendency for the motor 1 to be energized for operation in the upscale direction.

It is assumed that the magnitude of said apparatus input voltage decrease is sufficient to cause the error amplifier output signal on the downscale comparator input terminal 65 to be sufficiently positive to overcome the deadband bias voltage on the comparator input terminal 67 and to reverse the saturation of the comparator 29, thereby to switch the output signal on the output terminal 69 from negative to positive. This positive output signal is passed by the diode 105 and turns on the downscale triac 85, and hence constitutes a downscale motor drive signal.

The now turned on triac 85 causes the alternating current from the terminals 87 and 89 to pass through the downscale motor winding 23. At that time, the capacitor 97 produces a properly phased current flow through the upscale motor winding 21. The net result is that the motor rotor 17 rotates in the direction to move both the feedback contact 15 and the pointer 11 in the downscale direction.

As the motor 1 drives the feedback contact 15 in the downscale direction, the feedback voltage on the error amplifier input terminal 33 correspondingly decreases. All of this continues until the feedback voltage on the terminal 33 once again brings the output of the error amplifier 25 into the deadband. When this occurs, the output of the downscale motor drive comparator 29 switches from positive to negative, the downscale motor drive signal effectively disappears, the triac 85 turns off, and the energization of the motor 1 is terminated. The apparatus is now again in the balanced condition, with the pointer 11 at a new downscale position corresponding to the new, lower value of the apparatus input voltage. Again, the limit comparators 117 and 119 have had no effect on the motor drive comparators 27 and 29, since, as noted, the apparatus input voltage is assumed to have remained within the calibrated range of the apparatus.

It has been assumed in connection with the above-described operation that the input voltage has continually remained within the voltage range for which the apparatus has been calibrated. This means that there has been no occasion for the motor 1 to have attempted to drive the pointer 11 past the calibrated upscale and downscale markings on the scale 9, and hence to have attempted to drive the feedback contact 15 past its corresponding upscale and downscale limit positions. This means further that there has been no tendency for the feedback contact voltage on the conductors 41 and 141 to rise above the upscale limit voltage on the upscale travel limit voltage point 137, or to drop below the downscale limit voltage on the downscale travel limit voltage point 139.

Consequently, throughout the above-described operation, the feedback voltage on the inverting input terminal 121 of the upscale limit comparator 117 has been below the upscale limit voltage on the input terminal 123. This has caused the comparator 117 to be saturated and to produce a positive signal on its output terminal 125 and on the conductor 143. However, that positive signal has been blocked from affecting the upscale motor drive comparator 27, or its upscale motor drive signal, by the blocking action of the diode 145.

Similarly, the feedback voltage on the inverting input terminal 129 of the downscale limit comparator 119 has been above the downscale limit voltage on the input terminal 127. This has caused the comparator 119 to be saturated and to produce a negative signal on its output terminal 131 and on the conductor 147. However, that negative signal has been blocked from affecting the downscale motor drive comparator 29, or its downscale motor drive signal, by the blocking action of the diode 149. Accordingly, throughout the above-described operation, no activity on the part of the travel limiting means of the apparatus has occurred or been needed.

Let it now be assumed that the input voltage on the input terminal 7 increases to a new value which is above the voltage range for which the apparatus has been calibrated, and which, accordingly, tends to cause the motor 1 to drive the feedback contact 15 past its upscale limit position. Under this condition, the upscale motor drive comparator 27 produces an upscale motor drive signal which causes the motor 1 to move the feedback contact 15 upscale as before. This action continues until the contact 15 arrives at its upscale limit position, that is, arrives at the point at which the feedback voltage on the conductors 41 and 141 just rises above the upscale limit voltage on the upscale travel limit voltage point 137. At that position of the contact 15, the feedback voltage on the inverting input terminal 121 of the upscale limit comparator 117 overcomes the upscale limit voltage on the comparator input terminal 123 and reverses the saturation of the comparator 117. As a result, the signal on the output terminal 125 of the comparator 117 and on the conductor 143 swings or switches from positive to negative.

The negative signal now on the conductor 143 is not blocked by the diode 145, but instead appears on the inverting input terminal 49 of the upscale motor drive comparator 27. This signal is sufficiently negative to overcome the signal on the comparator input terminal 47, and hence to reverse the saturation of the comparator 27. The result of this is that the output signal on the comparator output terminal 51 switches from being a negative, motor drive signal to being a positive, non-drive signal. As a result, the upscale triac 83 is turned off, and the motor 1 is prevented from driving the contact 15 further in the upscale direction.

In summary, the arrival of the feedback contact 15 at its upscale limit position causes the upscale limit comparator output signal on the conductor 143 to switch from an ineffective positive signal to a negative signal which is an interrupting signal for the upscale motor drive comparator 27 and its upscale motor drive signal. It is noted that the arrival of the feedback contact 15 at its upscale limit position has no effect on the output of the downscale limit comparator 119, which continues to produce an ineffective negative signal on the conductor 147.

The above-described conditions prevail until the apparatus input signal drops below the value which caused the feedback contact 15 to move to its upscale limit position. When this occurs, the motor 1 is operative in the normal manner to move the contact 15 in the downscale direction as necessary to make its position correspond to the decreased value of the input signal.

Let it now be assumed that the input voltage on the input terminal 7 decreases to a new value which is below the voltage range for which the apparatus has been calibrated, and which, accordingly, tends to cause the motor 1 to drive the feedback contact 15 past its downscale limit position. Under this condition, the downscale motor drive comparator 29 produces a downscale motor drive signal which causes the motor 1 to move the feedback contact 15 downscale as before. This action continues until the contact 15 arrives at its downscale limit position, that is, arrives at the point at which the feedback voltage on the conductors 41 and 141 just falls below the downscale limit voltage on the downscale travel limit voltage point 139. At that position of the contact 15, the feedback voltage on the inverting input terminal 129 of the downscale limit comparator 119 is overcome by the downscale limit voltage on the comparator input terminal 127 and reverses the saturation of the comparator 119. As a result, the signal on the output terminal 131 of the comparator 119 and on the conductor 147 swings or switches from negative to positive.

The positive signal now on the conductor 147 is not blocked by the diode 149, but instead appears on the inverting input terminal 67 of the downscale motor drive comparator 29. This signal is sufficiently positive to overcome the signal on the comparator input terminal 65, and hence to reverse the saturation of the comparator 29. The result of this is that the output signal on the comparator output terminal 69 switches from being a positive, motor drive signal to being a negative, non-drive signal. As a result, the downscale triac 85 is turned off, and the motor 1 is prevented from driving the contact 15 further in the downscale direction.

In summary, the arrival of the feedback contact 15 at its downscale limit position causes the downscale limit comparator output signal on the conductor 147 to switch from an ineffective negative signal to a positive signal which is an interrupting signal for the downscale motor drive comparator 29 and its downscale motor drive signal. It is noted that the arrival of the feedback contact 15 at its downscale limit position has no effect on the output of the upscale limit comparator 117, which continues to produce an ineffective positive signal on the conductor 143.

The above-described conditions prevail until the apparatus input signal rises above the value which caused the feedback contact 15 to move to its downscale limit position. When this occurs, the motor 1 is operative in the normal manner to move the contact 15 in the upscale direction as necessary to make its position correspond to the increased value of the input signal.

It is seen from the foregoing description that whenever the feedback contact 15 is driven to one of its limit positions, the polarity of the output signal on the corresponding one of the limit comparator output conductors 143 and 147 reverses. That output signal then is passed by the corresponding one of the diodes 145 and 149 to the corresponding one of the motor drive comparator 25 input terminals 49 and 67. There, that limit comparator output signal reverses the polarity of the corresponding motor drive comparator output signal. This in turn effectively interrupts the last-noted signal from being a motor drive signal, and so terminates the operation of the motor 1 in the corresponding direction.

By way of illustration and example, and not by way of limitation, it is noted that typical values and component types for the illustrated apparatus are as follows:

Resistor 3, 1 Kohms
Amplifier 25, ½ type 1458
Comparators 27 and 29, Type 741C
Resistors 37 and 39, 10 Kohms
Resistors 43 and 45, 130 Kohms
Resistor 53, 10 Kohms
Resistor 55, 750 Kohms
Resistor 57, 5.11 Kohms
Resistor 61, 7.5 Megohms
Resistor 63, 10 Kohms
Resistor 71, 10 Kohms
Resistor 73, 750 Kohms
Resistor 75, 5.11 Kohms
Resistor 79, 7.5 Megohms
Resistor 81, 10 Kohms
Triacs 83 and 85, Type T 2300A
Voltage between terminals 87 and 89, 24 volts A.C.
Resistor 99, 1 Kohms
Diode 101, Type DA 1724
Resistor 103, 1 Kohms
Diode 105, Type DA 1724
Resistors 107 and 109, 10 Kohms
Resistor 111, 2 Kohms
Resistor 113, 97.6 Kohms
Resistor 115, 2 Kohms
Comparators 117 and 119, ½ type 1458
Resistors 133 and 135, 3 Megohms
Diodes 145 and 149, Type DA 1724
Compacitors 155 and 157, 0.1 MFD.

It is believed to be clear from the foregoing description that the described apparatus fulfills the objects stated herein. Thus, it has been shown that the described apparatus restricts the movement of its feedback element to an acceptable range of travel between designated limit positions in an entirely electrical manner and without the use of switches or other means which must be physically related in a specific manner to the limit positions and to the moving portions of the apparatus.

The embodiments of the invention in which an exclusive property or privilege is claimed are defined as follows:

1. In servo apparatus including a feedback device having an element which is positionable along a path and which produces a first voltage which represents the position of said element along said path, a motor coupled to said element for moving the latter along said path in response to motor drive signals fed to said motor, and motor drive means for comparing said first voltage to an apparatus input voltage to feed said motor with upscale and downscale motor drive signals which cause said motor to move said element in the direction and to the extent needed to bring said element position and said first voltage into correspondence with said input voltage, the improvement for electrically limiting the range of movement of said element, comprising means connected to a source of voltage to establish a second voltage which bears a preselected relationship to said first voltage when said element is at a preselected downscale travel limit position along said path, and to establish a third voltage which bears a preselected relationship to said first voltage when said element is at a preselected upscale travel limit position along said path, a first voltage comparator connected to receive and compare said first and second voltages to produce in an output a first motor drive modifying signal when the comparison of said first and second voltages indicates that said element is at said downscale limit position, a second voltage comparator connected to receive and compare said first and third voltages to produce in an output a second motor drive modifying signal when the comparison of said first and third voltages indicates that said element is at said upscale limit position, and means connecting said outputs of said first and second comparators to said motor drive means to cause said first modifying signal to modify the application of said downscale motor drive signal to said motor, and to cause said second modifying signal to modify the application of said upscale motor drive signal to said motor, thereby to limit the range of movement of said element along said path to that lying between said two limit positions.

2. In servo apparatus including a feedback device having an element which is positionable along a path and which produces a first voltage which represents the position of said element along said path, a motor coupled to said element for moving the latter along said path in response to motor drive signals fed to said motor, and motor drive means for comparing said first voltage to an apparatus input voltage to feed said motor with upscale and downscale motor drive signals which cause said motor to move said element in the direction and to the extent needed to bring said element position and said first voltage into correspondence with said input voltage, the improvement for electrically limiting the range of movement of said element, comprising means connected to a source of voltage to establish a second voltage which equals said first voltage when said element is at a preselected downscale travel limit position along said path, and to establish a third voltage which equals said first voltage when said element is at a preselected upscale travel limit position along said path, a first voltage comparator connected to receive and compare said first and second voltages to produce in an output a first motor drive interrupting signal when said first voltage falls below said second voltage, a second voltage comparator connected to receive and compare said first and third voltages to produce in an output a second motor drive interrupting signal when said first voltage rises above said third voltage, and means connecting said outputs of said first and second comparators to said motor drive means to cause said first interrupting signal to interrupt the application of said downscale motor drive signal to said motor, and to cause said second interrupting signal to interrupt the application of said upscale motor drive signal to said motor, thereby to limit the range of movement of said element along said path to that lying between said two limit positions.

3. Servo apparatus, comprising a feedback device having an element which is positionable along a path and which produces a feedback voltage which represents the position of said element along said path, motor drive means connected to compare said feedback voltage to an apparatus input voltage and to produce first and second output signals, said first output signal having one sense and said second output signal having the opposite sense when said feedback and input voltages are substantially equal, said first output signal switching to said opposite sense when said input voltage exceeds said feedback voltage, and said second output signal switching to said one sense when said feedback voltage exceeds said input voltage, motor means connected to receive said first and second output signals and coupled to said element for moving the latter along said path in the upscale direction solely when said first output signal has said opposite sense, and for moving said element along said path in the downscale direction solely when said second output signal has said one sense, limit voltage means connected to a source of voltage to establish a downscale limit voltage which corresponds to said feedback voltage when said element is at a downscale travel limit position along said path, and to establish an upscale limit voltage which corresponds to said feedback voltage when said element is at an upscale travel limit position along said path, a first limit voltage comparator connected to receive and compare said feedback and downscale limit voltages and to produce in an output a downscale motor drive modifying signal when the comparison of said feedback and downscale limit voltages indicates that said element is at said downscale limit position, a second limit voltage comparator connected to receive and compare said feedback and upscale limit voltages and to produce in an output an upscale motor drive modifying signal when the comparison of said feedback and upscale limit voltages indicates that said element is at said upscale limit position, and means connecting said outputs of said first and second comparators to said motor drive means to cause said downscale modifying signal to reverse the sense of said second output signal from said one sense to said opposite sense to interrupt the downscale movement of said element, and to cause said upscale modifying signal to reverse the sense of said first output signal from said opposite sense to said one sense to interrupt the upscale movement of said element, thereby to limit the range of movement of said element along said path to that lying between said travel limit positions.

4. Apparatus as specified in claim 3, wherein said motor drive means includes an error amplifier which is connected to receive and compare said feedback and input voltages to produce an error signal representing the difference between the last-mentioned voltages, an upscale motor drive comparator which is connected to receive and compare said error signal and a first bias signal to cause said first output signal to have said one sense when said first bias signal predominates over said error signal, and to have said opposite sense when said error signal predominates over said first bias signal, and a downscale motor drive comparator which is connected to receive and compare said error signal and a second bias signal to cause said second output signal to have said opposite sense when said second bias signal predominates over said error signal, and to have said one sense when said error signal predominates over said second bias signal, wherein said downscale modifying signal is applied to said downscale motor drive comparator and overcomes said error signal to reverse the sense of said second output signal from said one sense to said opposite sense to interrupt the downscale movement of said element, and wherein said upscale modifying signal is applied to said upscale motor drive comparator and overcomes said error signal to reverse the sense of said first output signal from said opposite sense to said one sense to interrupt the upscale movement of said element.

5. Apparatus as specified in claim 3, wherein said feedback device is a slidewire resistor having a body which is connected across said source of voltage, said element is a contact which is positionable along said body, said limit voltage means is a resistor string which is connected across both said body and said source of voltage, and said upscale and downscale limit voltages are established at corresponding points on said resistor string.

6. Apparatus as specified in claim 3, wherein said motor means includes a motor having a rotor which is coupled to said element, an upscale diode, an upscale motor drive switch which is connected to said motor and is connected to receive said first output signal by way of said diode to permit said switch to energize said motor for movement of said element in the upscale direction solely when said first output signal has said opposite sense,
a downscale diode, and
a downscale motor drive switch which is connected to said motor and is connected to receive said second output signal by way of said downscale diode to permit said downscale switch to energize said motor for movement of said element in the downscale direction solely when said second output signal has said one sense.

* * * * *